(12) United States Patent
Hsu

(10) Patent No.: US 7,413,150 B1
(45) Date of Patent: Aug. 19, 2008

(54) FLAT PANEL DISPLAY STAND

(75) Inventor: Chun-Ching Hsu, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 0 days.

(21) Appl. No.: 11/764,935

(22) Filed: Jun. 19, 2007

(51) Int. Cl.
*F16L 3/00* (2006.01)
*E04G 3/00* (2006.01)

(52) U.S. Cl. ............... 248/123.11; 248/125.2; 248/125.8; 248/276.1; 248/286.1; 361/681

(58) Field of Classification Search .......... 248/121, 248/125.1, 125.2, 123.11, 125.8, 274.1, 276.1, 248/280.11, 284.1, 286.1, 676, 917–919, 248/404, 176.3; 361/681, 682, 683
See application file for complete search history.

(56) References Cited

U.S. PATENT DOCUMENTS

| | | | | |
|---|---|---|---|---|
| 6,189,849 B1 * | 2/2001 | Sweere et al. | ............ | 248/286.1 |
| 6,712,321 B1 * | 3/2004 | Su et al. | ................ | 248/123.11 |
| 6,874,738 B2 * | 4/2005 | Ishizaki et al. | ........... | 248/176.3 |
| 6,874,743 B2 * | 4/2005 | Watanabe et al. | ........ | 248/276.1 |
| 6,918,564 B2 * | 7/2005 | Yen et al. | .................. | 248/125.8 |
| 7,036,787 B1 * | 5/2006 | Lin | ............................. | 248/676 |
| 7,274,555 B2 * | 9/2007 | Kim et al. | .................... | 361/681 |
| 2004/0118984 A1 * | 6/2004 | Kim et al. | .................... | 248/917 |
| 2006/0038092 A1 * | 2/2006 | Choi | .......................... | 248/121 |
| 2006/0118680 A1 * | 6/2006 | Yen | ............................. | 241/121 |
| 2006/0219849 A1 * | 10/2006 | Chiu | ....................... | 248/125.8 |

* cited by examiner

*Primary Examiner*—Amy J Sterling
*Assistant Examiner*—Tan Le
(74) *Attorney, Agent, or Firm*—Rabin & Berdo P.C.

(57) ABSTRACT

A flat panel display stand has a base, a post, a resilient assembly and a holding bracket. The post is securely mounted perpendicularly on the base and has a channel defined inside the post and two guide slots formed through the post opposite to each other. The resilient assembly is mounted slidably in the channel of the post and has two friction feet and a coil spring. The friction feet are mounted respectively in the guide slots and generate adequate friction to hold the resilient assembly in place. The coil spring has an end secured in the channel and provides a resilient force to hold the resilient assembly in position. The holding bracket is connected to a flat panel display and is attached to the resilient assembly through the guide slots. The flat panel display stand is compact and facilitates adjustment of the position of the flat panel display.

5 Claims, 5 Drawing Sheets

FLAT PANEL DISPLAY STAND

BACKGROUND OF THE INVENTION

1. Field of the Invention

The present invention relates to a stand, and more particularly to a flat panel display stand that is compact in structure and facilitates adjustment of the position of a flat panel display mounted on the stand.

2. Description of Related Art

Flat panel displays have virtually replaced traditional cathode ray tube displays as standard equipment for personal computers because of the advantages of the flat panel displays like low radiation, small volume and light weigh. Generally, a flat panel display is mounted rotatably and movably on a flat panel display stand that allows the angle and possibly the height of the flat panel display to be adjusted.

Conventional flat panel display stands make using flat panel displays convenient, but improvements still need to be made to overcome disadvantages such as those that follow.

1. Many components of flat panel display stands protrude from the surface of the flat panel display stand and adversely affect the appearance of the flat panel display stand.

2. Adjusting the flat panel display stand is difficult, because friction to hold the flat panel display is usually excessive.

3. A large cover is required to cover all of the components of the flat panel display stand, which causes the flat panel display stand to have large volume and be troublesome to carry.

To overcome the shortcomings, the present invention provides a flat panel display stand to obviate or mitigate the aforementioned problems.

SUMMARY OF THE INVENTION

The main objective of the present invention is to provide a flat panel display stand that is compact and has adequate friction to hold a flat panel display in position.

The flat panel display stand in accordance with present invention comprises a base, a post, a resilient assembly and a holding bracket. The base can be mounted on any plane. The post is securely mounted perpendicularly on the base, has a channel defined inside the post and two guide slots formed through the post opposite to each other. The resilient assembly is mounted slidably in the channel and has two friction feet and a coil spring. The friction feet are mounted respectively in the guide slots of the post to guide the resilient assembly and generate adequate friction to hold the resilient assembly in position. The coil spring has an end secured in the channel and provides a resilient force to hold the resilient assembly in position. The holding bracket holds a flat panel display and is secured to the resilient assembly through the guide slots.

With such an arrangement, the flat panel display stand is compact and generates adequate friction to hold a flat panel display and allows the flat panel display to be adjusted easily.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
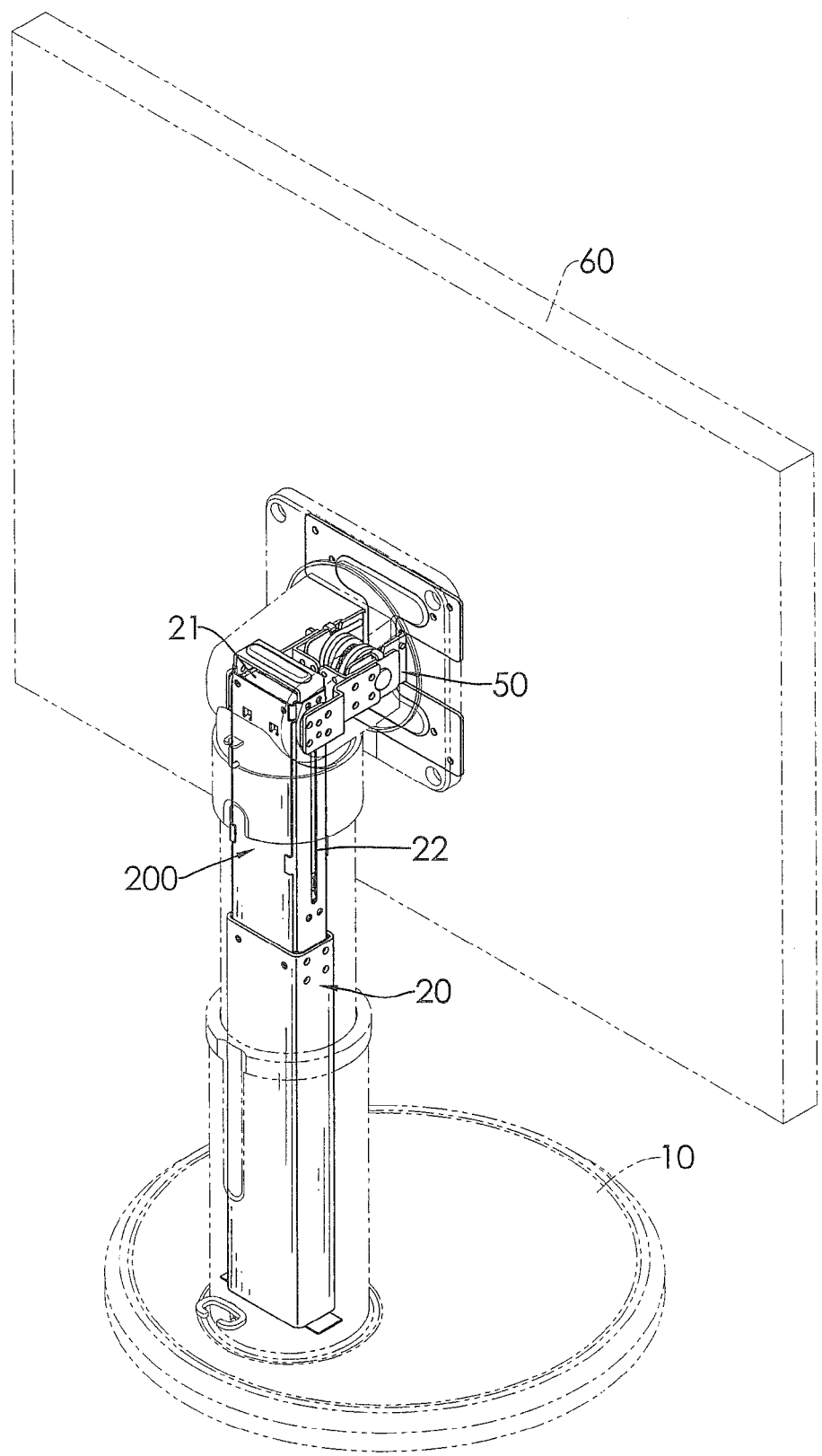
FIG. 1 is a perspective view of a flat panel display stand in accordance with the present invention.
Figure 2:
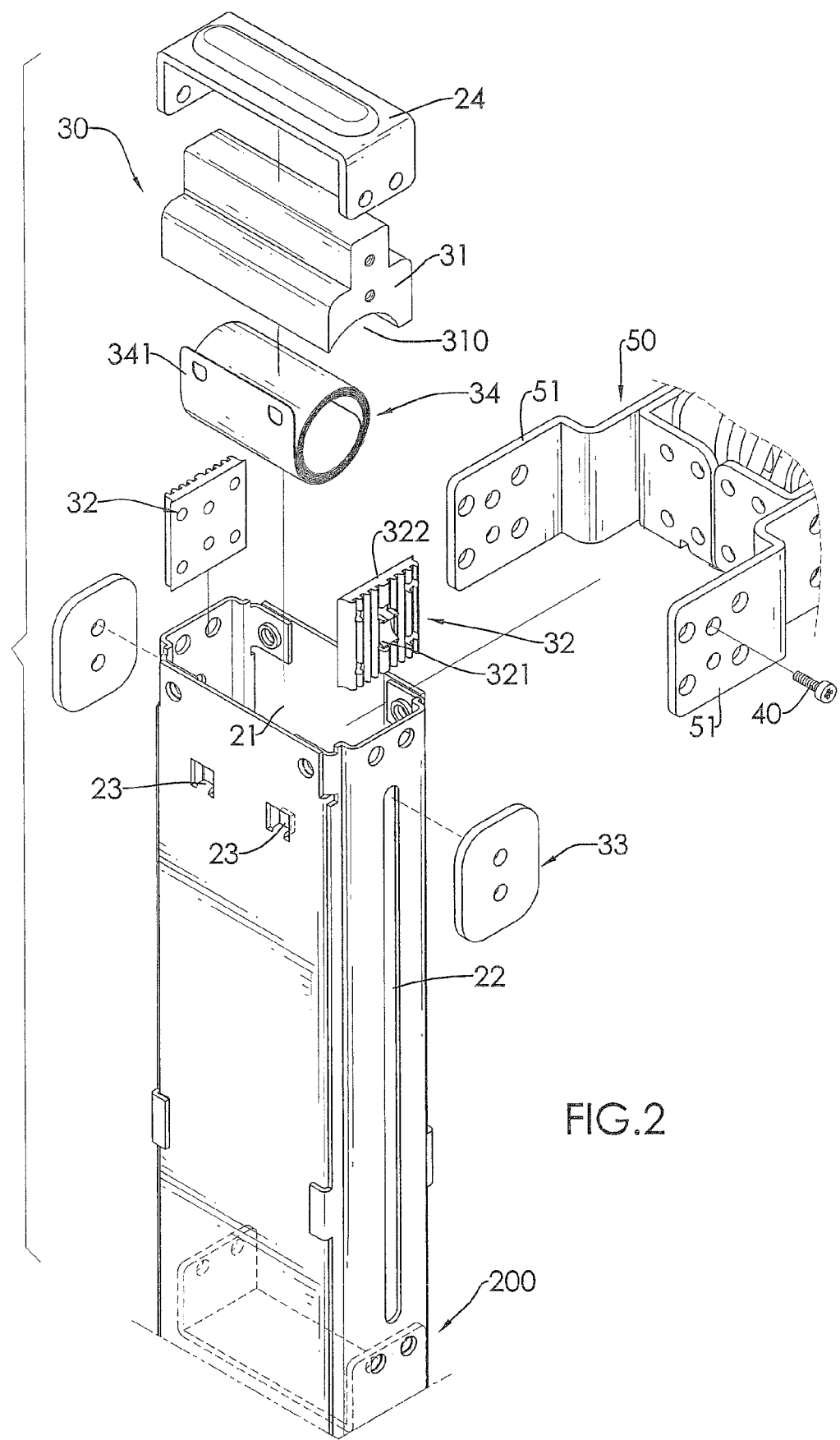
FIG. 2 is an enlarged exploded perspective view of a post, a resilient assembly and part of a holding bracket in the flat panel display stand in FIG. 1.

With reference to FIGS. 1 and 2, a flat panel display stand in accordance with the present invention adjustably positions and holds a flat panel display (60) and comprises a base (10), a post (20), a resilient assembly (30), multiple fasteners (40) and a holding bracket (50).

The base (10) can be mounted on any plane.

The post (20) is connected securely to and protrudes perpendicularly from the base (10), may be telescopic and square tubular and has a top, a bottom, two sides, a channel (21), an inner surface, two guide slots (22), two optional hooks (23) and two optional braces (24).

The channel (21) is formed longitudinally inside the post (20) and may be rectangular in cross section.

The inner surface is formed in the channel (21).

The guide slots (22) are formed respectively through the sides of the post (20) opposite to each other and communicate with the channel (21).

The hooks (23) protrude from the inner surface of the channel (21) near the top of the post (20).

The braces (24) may be "U" shaped, are mounted securely respectively across the top and the bottom of the post (20).

The resilient assembly (30) is mounted slidably in the channel (21) and has a driver (31), two friction feet (32), two mounting plates (33) and a coil spring (34).

The driver (31) is mounted slidably in the channel (21) between the guide slots (22) and has two ends, a bottom, multiple securing holes and a concave recess (310). The securing holes are formed in the ends of the driver (31). The concave recess (310) may be semicircular, is formed transversely in the bottom of the driver (31).

The friction feet (32) are mounted in the channel (21) between the ends of the driver (31) and the sides of the post (20), and each friction foot (32) is flat and resilient and has a friction surface, multiple mounting holes, multiple ribs (322) and at least two blocks (321). The friction surfaces correspond to and abut the inner surface of the post (20) adjacent respectively to the guide slots (22). The mounting holes are formed through the friction foot (32) and correspond respectively to the securing holes in the driver (31). The ribs (322) are formed on the friction surface of the friction foot (32) and rub against the inner surface of the post (20) to provide friction that allows the supporting bracket to slide somewhat. The blocks (321) are formed on and protrude from the friction surface of the friction foot (32) and mounted slidably respectively in the guide slots (22).

The mounting plates (33) are mounted outside the post (20) and correspond respectively to the friction feet (32), and each mounting plate (33) has multiple through holes corresponding respectively to the mounting holes in the corresponding friction foot (32).

Figure 3:
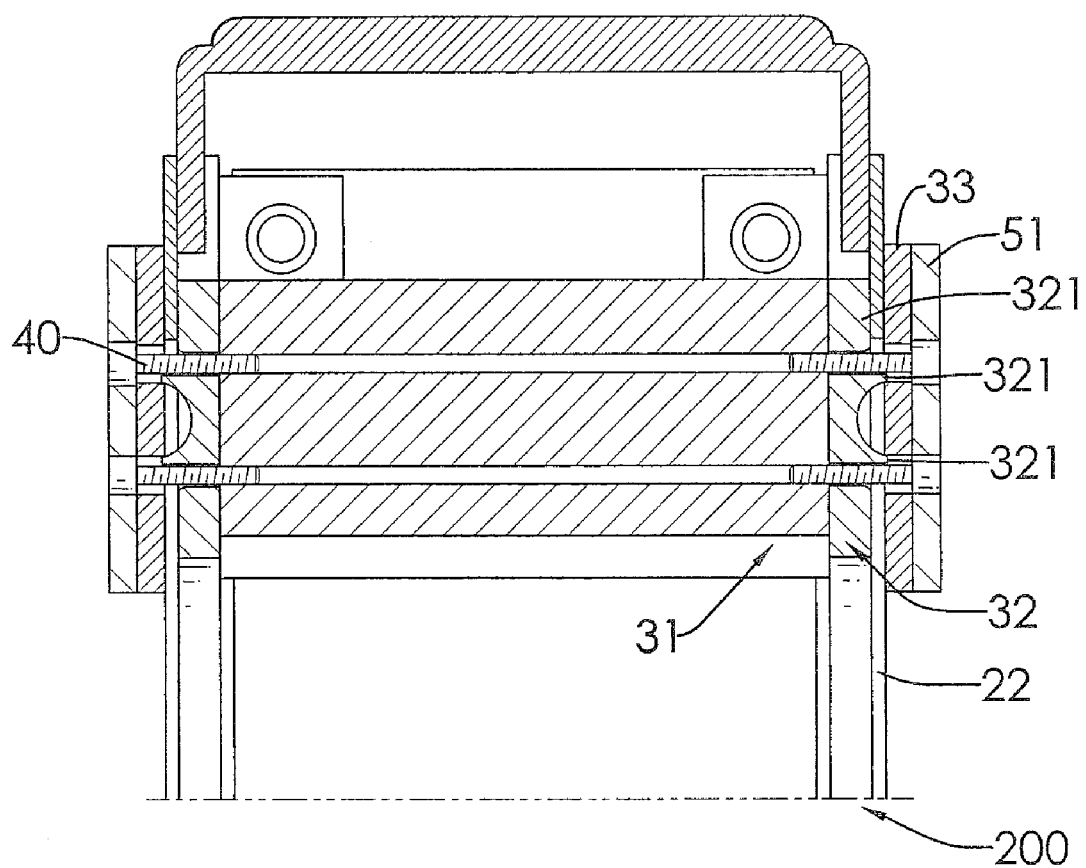
FIG. 3 is an enlarged rear cross sectional view of the post and resilient assembly of the flat panel display stand in FIG. 1.
Figure 4:
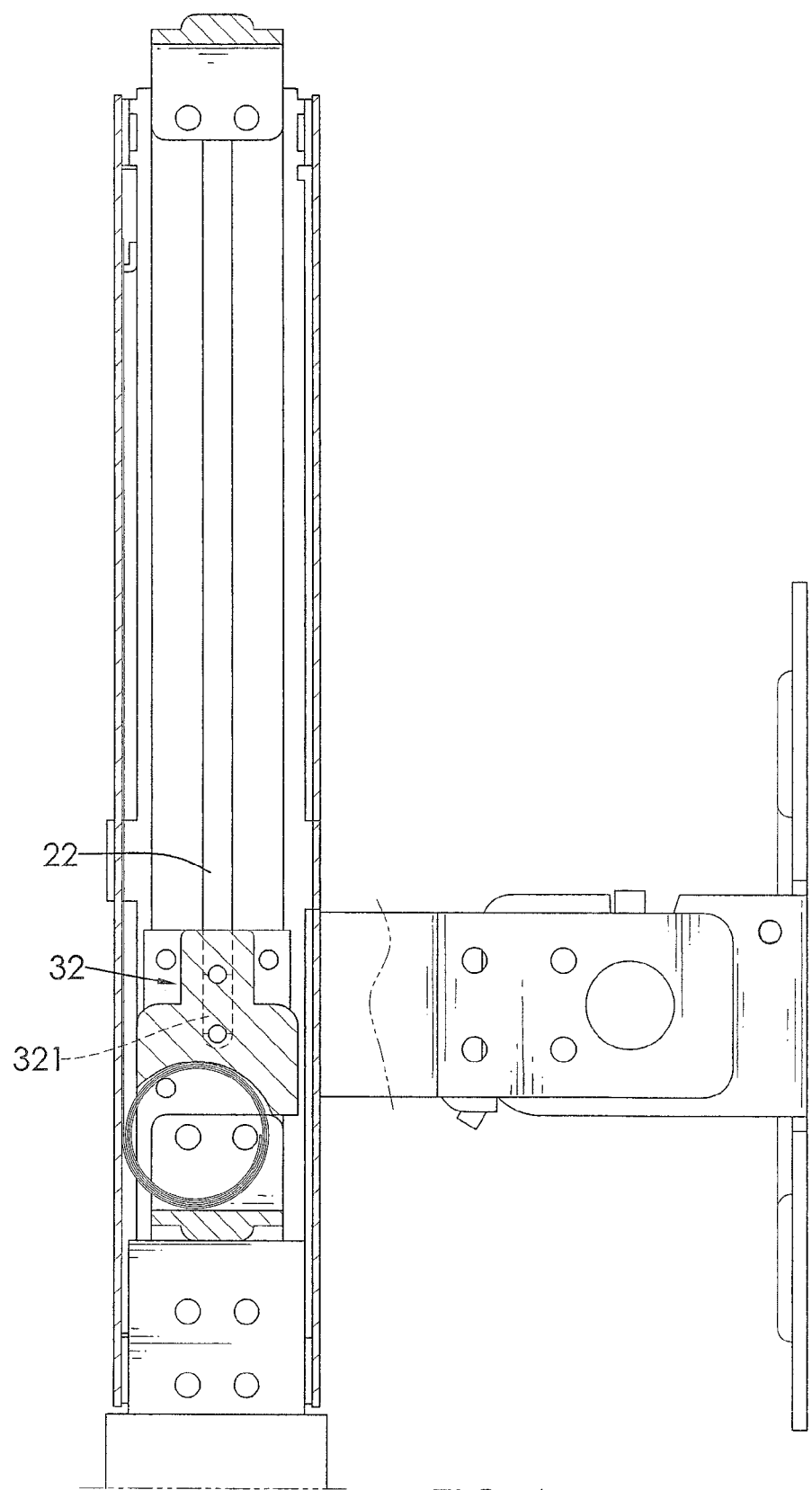
FIG. 4 is an operational side view in partial section of the flat panel display stand in FIG. 1.

With further reference to FIGS. 2, 3 and 4, the coil spring (34) has a mounting end, two optional notches (341) and a wound end. The mounting end is attached to the inner surface of the post (20) near the top. The notches (341) are formed through the coil spring (34) adjacent to the mounting end and correspond to and hook respectively on the hooks (23) on the inner surface of the post (20). The wound end is mounted in the concave recess (310) of the driver (31), is unwound when the resilient assembly (30) moves down and provides a resilient force to hold the resilient assembly (30) in position.

The fasteners (40) extend through the fixing holes in the mounting plates (33) and the mounting holes in the friction feet (32) and are mounted in the securing holes in the driver (31) to attach the friction feet (32) to the driver (31) and makes the friction feet (32) and the mounting plates (33) rub against the post (20) adjacent to one of the guide slots (22) to generate friction to hold the resilient assembly (30) in position.

The holding bracket (50) is connected to a flat panel display (60) and has two wings (51) protruding backward. The wings (51) have multiple through holes corresponding respectively to the fixing holes in the mounting plates (33) and are held in place by the fasteners (40).

Figure 5:
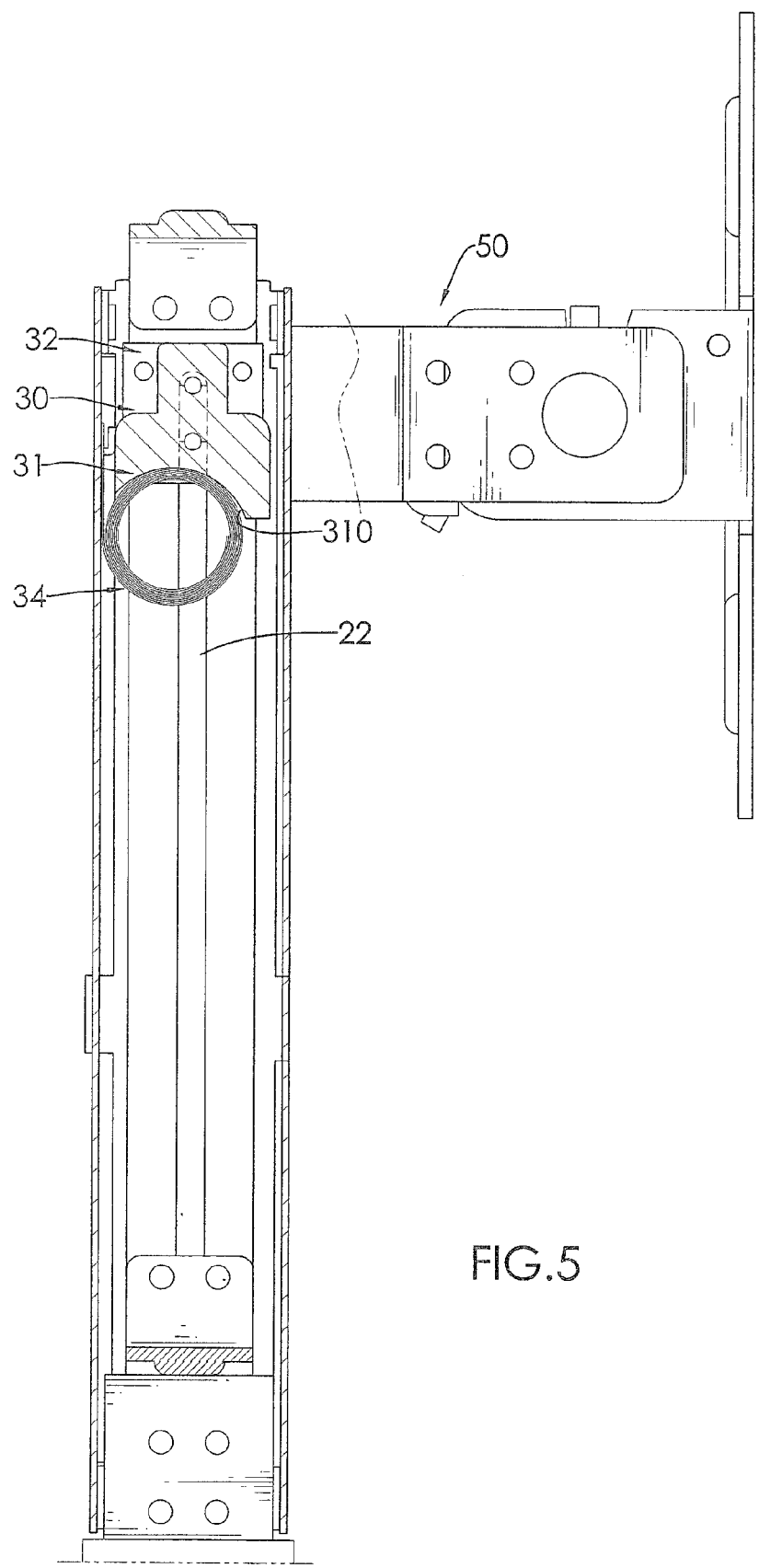
FIG. 5 is an operational side view in partial section of the flat panel display stand in FIG. 1 with the holding bracket near the top of the post.

With further reference to FIGS. 4 and 5, the flat panel display stand as described is compact and provides adequate friction to hold the holding bracket (50) in position, and the wound end of the coil spring (34) is gradually extended to provide a balanced resilient force corresponding to the flat panel display (60) mounted on the holding bracket (50) to hold the resilient assembly (30) in position. Furthermore, the friction generated by the friction feet (32) allows adjustment of the flat panel display (60) with only a slight force.

Even though numerous characteristics and advantages of the present invention have been set forth in the foregoing description together with details of the structure and function of the invention, the disclosure is illustrative only. Changes may be made in detail especially in matters of shape, size and arrangement of parts within the principles of the invention to the full extent indicated by the broad general meaning of the terms in which the appended claims are expressed.

What is claimed is:

1. A flat panel display stand comprising
   a base;
   a post being connected securely to and protruding perpendicularly from the base and having
      a top;
      a bottom;
      two sides;
      a channel being formed longitudinally inside the post;
      an inner surface being formed in the channel; and
      two guide slots being formed respectively through the sides of the post opposite to each other and communicating with the channel;
   a resilient assembly being mounted slidably in the channel and having
      a driver being mounted movably in the channel and having
         two ends;
         a bottom;
         multiple securing holes being formed in the ends of the driver; and
         a concave recess being formed transversely in the bottom of the driver;
      two friction feet being mounted in the channel between the ends of the driver and the sides of the post, and each friction foot being flat and resilient and having
         a friction surface corresponding to and abutting the inner surface of the post adjacent to one of the guide slots;
         multiple mounting holes being formed through the friction foot and corresponding respectively to the securing holes in the driver;
         multiple ribs being formed on the friction surface of the friction foot and rubbing against the inner surface of the post; and
         at least two blocks being formed on and protruding from the friction surface of the friction foot and mounted slidably respectively in the corresponding guide slot;
      two mounting plates being mounted outside the post and corresponding respectively to the friction feet outside the post, and each mounting plate having multiple through holes corresponding respectively to the mounting holes in the corresponding friction foot; and
      a coil spring having
         a mounting end secured on the inner surface of the post near the top; and
         a wound end being mounted in the concave recess of the driver, being unwound when the resilient assembly moves down and providing a resilient force to hold the resilient assembly in position;
   multiple fasteners extending through the fixing holes in the mounting plates and the mounting holes in the friction feet and being secured in the securing holes in the driver to attach the friction feet to the driver and making the friction feet and the mounting plates rub against the inner surface of the post adjacent to one of the guide slots to generate friction to hold the resilient assembly in position; and
   a holding bracket being adapted for being connected to a flat panel display and having two wings protruding backward and having multiple through holes corresponding respectively to the fixing holes in the mounting plates and being held in place by the fasteners.

2. The flat panel display stand as claimed in claim 1, wherein
   the post further has two hooks protruding from the inner surface of the channel near the top of the post; and
   the coil spring further has two notches being formed through the coil spring adjacent to the mounting end and corresponding to and hooking respectively on the hooks on the inner surface of the post.

3. The flat panel display stand as claimed in claim 1, wherein the post further has two braces being mounted securely respectively across the top and the bottom of the post.

4. The flat panel display stand as claimed in claim 1, wherein the channel of the post is rectangular in cross section.

5. The flat panel display stand as claimed in claim 1, wherein the concave recess of the driver is semicircular.

* * * * *